July 2, 1963 F. R. STACHOWIAK ET AL 3,096,397
AUDIO MUTING CIRCUIT
Filed Feb. 3, 1961
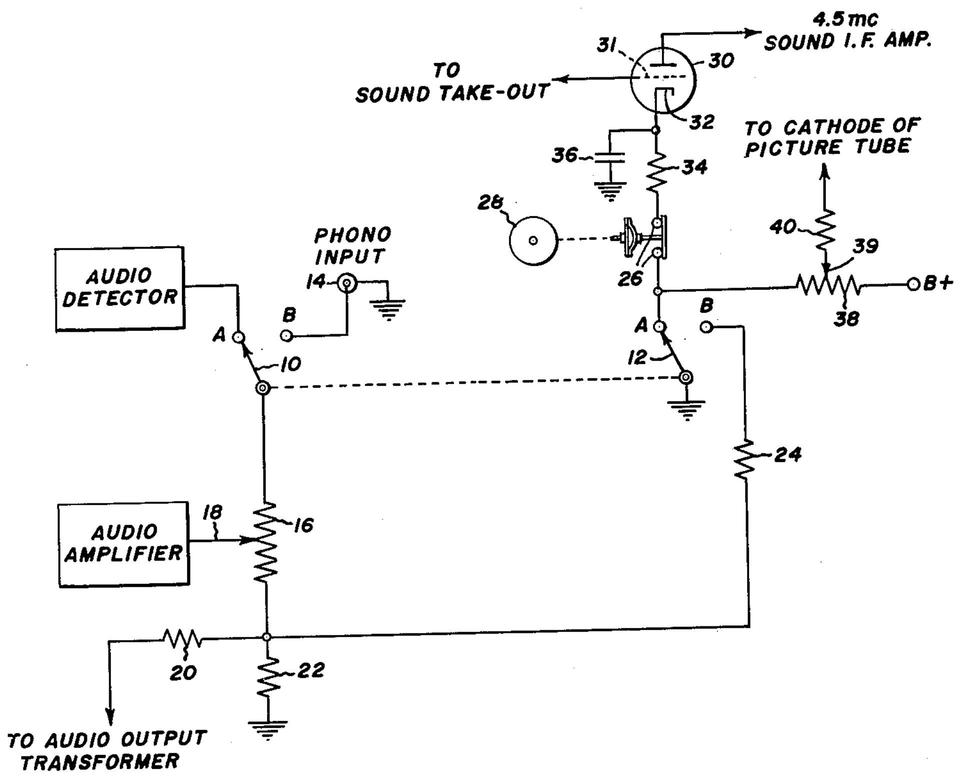
INVENTORS:
FRANK R. STACHOWIAK,
NORMAN SZEREMY,
BY Joseph Levinson
THEIR ATTORNEY.

United States Patent Office 3,096,397

Patented July 2, 1963

3,096,397

AUDIO MUTING CIRCUIT

Frank R. Stachowiak, Manlius, and Norman Szeremy, Syracuse, N.Y., assignors to General Electric Company, a corporation of New York Filed Feb. 3, 1961, Ser. No. 86,900

6 Claims. (Cl. 178—5.8)

This invention relates to an audio muting circuit for a television receiver.

Many television receivers are provided with phonograph inputs whereby the output of a phonograph pick-up device is coupled to the audio amplifier system of the television receiver. This allows the audio amplifier system of the television receiver to be utilized as a part of a phonograph system when not used as part of the television receiver. Preferably, when the audio amplifier system of the television receiver is utilized for the phonograph function, the television video and sound signals must be muted. It has also been found desirable to mute the television sound signal when switching from channel to channel in power tuning. The power tuning function is generally performed by remote control which activates a motor for driving the tuner shaft of a television tuner to switch channels. By muting or disabling the television sound channel, undesirable noise is prevented from emanating from the television receiver during the performance of this function.

Prior methods of audio muting have generally taken the form of grounding a grid in the audio amplifier or removing the B+ potential from the 4.5 megacycle sound intermediate frequency amplifier. These methods are undesirable because hum, tweets, and capacitive feedthrough of signals which would be applied to the loudspeaker. Eliminating this undesirable noise using the aforesaid methods requires extra components for decoupling, filtering or further grounding of noise signals which makes the muting circuits more costly.

Accordingly, it is an object of this invention to provide a novel audio muting circuit for a television receiver which effectively disables the television sound system when switching between programmed channels on television receivers incorporating power tuning.

A further object of this invention is to provide a novel audio muting circuit for a television receiver which performs the function of connecting the output of a suitable phonograph pick-up device to the input of the audio amplifier system of a television receiver while muting the sound IF amplifier and blanking the television picture tube.

A further object of this invention is to provide a novel audio muting circuit which reduces the amount of inverse feedback when the circuit is connected for phonograph operation to provide added gain during the operation of this function.

Still a further object of this invention is to provide a novel audio muting circuit which provides all of the aforesaid functions at a minimum cost.

In carrying out this invention in one illustrative embodiment thereof, a ganged switching arrangement is provided having two operative positions, one for television operation and the other for phonograph operation. Muting is accomplished by breaking the cathode circuit of the sound intermediate frequency amplifier of the television receiver. Power tuning contacts are inserted in the cathode circuit of the sound intermediate frequency amplifier which open this circuit while the channel selection function is being performed. For phonograph operation, the switching circuit disconnects the cathode circuit of the sound intermediate frequency amplifier from ground and switches in the phonograph input to the audio amplifier of the television sound system. At the same time, the circuit for the brightness control of the picture tube is opened.

The invention both as to its organization and method of operation, together with further objects and advantages thereof, may best be understood from the following description taken in connection with the accompanying drawing.

The drawing is a schematic diagram of the novel audio muting circuit embodied in this invention.

The drawing has been considerably simplified in order to more clearly illustrate the invention. The portions of the television receiver which are referred to but not specifically shown are deemed to be conventional and do not constitute a part of this invention and have not been specifically illustrated to simplify this disclosure.

Referring now to the drawing, a pair of gang switches 10 and 12 having two operative positions A and B are provided for performing the necessary switching operations for this invention. Position A of switch 10 is connected to the output of the audio detector of the television receiver and position B of switch 10 is connected to a phonograph jack 14 which is adapted to receive the output of a phonograph pick-up device. The switch 10 is connected to a volume control potentiometer 16 having a variable arm 18 connected to the audio amplifier of the television receiver. The volume control 16 is connected via a resistor 22 to ground. The junction of volume control 16 and resistor 22 is connected via a resistor 20 to the audio output transformer of the television receiver and also via a resistor 24 to position B of switch 12.

The switch 12 is connected to ground. Position A of switch 12 is connected to a potentiometer 38 which is connected to a source of B+ potential. The tap 39 on potentiometer 38 is connected via a resistor 40 to the cathode of the picture tube of the television receiver. Position A of switch 12 is also connected in the cathode circuit of the 4.5 megacycle sound intermediate frequency amplifier of the television receiver. This sound amplifier represented by tube 30 has a control grid 31 and a cathode 32. The 4.5 megacycle signal is applied from the sound takeoff circuit of the television receiver to the control grid 31 of the amplifier 30. The cathode 32 of amplifier 30 has a cathode resistor 34 which is by-passed by a capacitor 36 to ground. Also connected in the cathode circuit is a pair of normally closed contacts 26 which are adapted to be opened by a power tuning motor 28. When the power tuning motor 28 is activated for channel selection purposes, the contacts 26 are opened.

With the ganged switches 10 and 12 in position A, which is the television position shown in the drawing, the output of the audio detector is connected through switch 10 to the input of the audio amplifier system of the television receiver. The switch 12 completes the ground return or cathode circuit of the sound IF amplifier and with the contacts 26 closed, the sound channel of the television receiver performs normally. The brightness control 38 is also returned to ground through switch 12 in position A allowing the brightness control to function in a normal manner. When the power tuning mechanism is operated for channel switching, the muting contacts 26 open thereby disabling the audio system and thus eliminating sound output during channel switching. When the desired channel is reached, the muting contacts 26 close, returning the performance of the television receiver sound system to normal.

When ganged switches 10 and 12 are switched to the B or phonograph position, switch 10 connects the output of a phonograph pick-up device to the input of the audio amplifier system of the television receiver. Switch 12 in the B position connects resistor 24 to ground thereby shunting resistor 22 at the base of the volume control 16 which increases the audio amplifier gain by virtue of the shunting action which reduces the inverse feedback in the audio amplifier system. Switch 12 in the B position also opens the ground path or cathode circuit of sound IF amplifier 30 and the brightness control 38 which disables the television sound IF system and cuts off the picture tube, respectively. The disabling of amplifier 30 is usually required to prevent feedthrough of the sound output of the television sound detector into the audio amplifier system. By connecting the positive voltage of the brightness control 38 to the cathode 32 when switch 12 is in the B position, further insurance is provided that this stage is completely cut-off by placing a large positive voltage on its cathode.

Picture blanking may also be achieved during channel selection by the power tuning motor if the brightness control 38 is connected to the other side of the normally closed contacts 26. Accordingly, on the opening of these contacts, the ground connection would be removed from the brightness control thereby blanking the cathode ray tube of the television receiver.

Since other modifications varied to fit the particular operating requirements and environments will be apparent to those skilled in the art, the invention is not considered limited to the examples chosen for purposes of disclosure and covers all changes and modifications which do not constitute departures from the true spirit and scope of this invention.

What we claim as new and desire to secure by Letters Patent of the United States is:

1. An audio muting circuit for a television receiver having a phonograph input terminal, a sound intermediate frequency amplifier having a cathode circuit, a two position switch means in said cathode circuit for completing said cathode circuit to a source of reference potential in one position when said amplifier is normally functioning as a part of said television receiver, said switch means opening said cathode circuit in said other position thereby muting said amplifier for phonograph operation.

2. An audio muting circuit for a television receiver having a phonograph input terminal, a sound intermediate frequency amplifier having a cathode circuit, a ganged switch having a first position and a second position connected in said cathode circuit, said switch operating said television receiver for the reception of television sound signals in said first position and providing a connection between said cathode circuit and a source of ground reference potential, said switch operating said television receiver for reception of phonograph signals from said phonograph input terminal in said second position and opening said cathode circuit to mute said amplifier in said second position.

3. The structure defined in claim 2 including a set of normally closed contacts in said cathode circuit operated by a power tuning motor to open said cathode circuit and mute said amplifier when said power tuning motor is operated for channel selection.

4. The structure defined in claim 2 including a brightness control circuit connected in said cathode circuit, said brightness control circuit being completed in said first position and being opened in said second position to provide picture blanking for said receiver.

5. An audio muting circuit for a television receiver having an audio detector, an audio amplifier, a volume control, a brightness control, and a sound intermediate frequency amplifier having a cathode circuit, a phonograph input terminal, first and second switch means being ganged and having first and second operative positions, means for connecting said volume control to said audio amplifier, means for connecting said brightness control to said cathode circuit, said first and second switch means when in said first position connecting said audio detector to said volume control and connecting said cathode circuit to a common source of reference potential whereby said receiver is functioning normally for the reception of television sound signals, said first and second switches when operated to said second position connecting said phonograph input terminal to said volume control and opening said cathode circuit to mute said television receiver.

6. The structure defined in claim 5 including a set of normally closed contacts in said cathode circuit operated by a power tuning motor to open said cathode circuit and mute said amplifier when said power tuning motor is operated for channel selection.

References Cited in the file of this patent

UNITED STATES PATENTS

| | | |
|---|---|---|
| 2,549,444 | Foster | Apr. 17, 1951 |
| 2,609,441 | Keizer | Sept. 2, 1952 |
| 2,611,818 | Koch | Sept. 23, 1952 |
| 2,617,878 | Goldfus | Nov. 11, 1952 |
| 2,940,004 | Bonner | June 7, 1960 |